United States Patent [19]
Cheng et al.

[11] Patent Number: 5,331,628
[45] Date of Patent: Jul. 19, 1994

[54] PATH TESTING AND/OR MONITORING WITHIN A MULTIPLE NODE TELECOMMUNICATION SYSTEM

[75] Inventors: Ying Cheng; Kao-Shien Liu, both of Holmdel, N.J.

[73] Assignee: AT&T Bell Laboratories, Murray Hill, N.J.

[21] Appl. No.: 37,776

[22] Filed: Mar. 25, 1993

[51] Int. Cl.⁵ .............................................. H04J 3/14
[52] U.S. Cl. ..................................... 370/14; 371/20.1
[58] Field of Search ................... 370/13, 14, 54, 58.1, 370/60; 340/825.03, 826; 371/20.1, 20.2; 379/10, 16, 17, 18

[56] References Cited

U.S. PATENT DOCUMENTS 4,730,302  3/1988  Fuerlinger et al. ............... 370/13
5,034,945  7/1991  Kimoto et al. .................... 370/14

OTHER PUBLICATIONS

.International Telegraph and Telephone Consultative Committee (CCITT) Recommendation G.783 on Equipment for the Synchronous Digital Hierarchy (SDH); Nov. 10, 1992.

Primary Examiner—Benedict V. Safourek
Attorney, Agent, or Firm—Robert P. Marley

[57] ABSTRACT

A multiple node telecommunication system path identification technique enabling expedited path testing and/or monitoring, and providing rapid confirmation upon completion of a successful testing and/or monitoring function. The technique eliminates erroneous system alarms arising from a properly transmitted PID arriving at a given node prior to the receipt at that node of the correct PID from a system controller. This is accomplished by employing a memory at each system node capable of storing the most recent PID sent to the node by the system controller, the previous PID sent to the node by the system controller, and the PID received from another system node, or from a transmitter linked to a system transmission path. Each of the nodes within the telecommunication system facilitating the technique is further adapted to accept a PID received via a transmission path without triggering an alarm, if that received PID matches either the most recent or previous PIDs received from the system controller. The nodes are also configured to tolerate a mismatch between a PID received via a transmission path and the stored PIDs received from the system controller for a specified period of time before initiating an alarm, so that if the mismatch may be reconciled if it is merely an erroneous condition brought about by a delay in communication between the node and the system controller.

2 Claims, 2 Drawing Sheets

PATH TESTING AND/OR MONITORING WITHIN A MULTIPLE NODE TELECOMMUNICATION SYSTEM

TECHNICAL FIELD

The invention relates to telecommunication networks and, more particularly, to management systems for such networks.

Background of the Invention

In carrying out various testing and/or monitoring functions within multiple node telecommunication systems, it is necessary to identify specific internode cross-connect paths. Typically, these testing/monitoring functions are categorized as follows: new link/circuit testing; idle link monitoring; and pre-service circuit testing. New link/circuit testing is a long and involved process designed to detect transmission circuit quality. Idle link monitoring is typically performed as an ongoing maintenance function to ascertain the status of existing idle links. Pre-service circuit testing is performed immediately prior to placing a given circuit path into service (during system reconfiguration or path restoration). While the time it takes to perform such testing/monitoring may not be critical for new link testing, it is of concern in most other instances and should be kept to a minimum.

When performing the above testing and monitoring functions, a path trace identification signal ("PID") is transmitted over a specified path, and its receipt monitored at each node along that path. Within present multiple node telecommunication systems, which conform to Consultative Committee on International Telegraphy and Telephony ("CCITT") recommendation G.783, each node has the capability of storing two PID values—the received PID, and the expected PID. A two-node portion of one such system is illustrated in FIG. 1. In performing a testing or monitoring function within the illustrated system, the proper PID is transmitted by system controller 101 to each of nodes 102 and 103 via control lines 104 and 105. The PID received from system controller 101 is stored in a memory location within each node reserved for "expected" PIDs (memory location 106 for node 102, and memory location 107 for node 103). This stored "expected" PID will remain in the reserved memory within a node until the node receives a new "expected" PID from the system controller. Each node within the system acknowledges the receipt of a new "expected" PID from the system controller by transmitting a confirmation signal to the system controller.

Upon receipt of a confirmation signal from all of the nodes within the path, the system controller sends a clearance message to transmitter 108. After receiving this clearance message, transmitter 108 transmits the proper PID to nodes 102 and 103 via transmission path 109. This transmitted PID is stored in a memory location within each node reserved for "received" PIDs (memory location 110 for node 102, and memory location 111 for node 103). If all "expected" PIDs were loaded into the proper memory locations within a node prior to the reception of a "received" PID at that node, the testing or monitoring should proceed smoothly. No system alarms will be triggered as all "received" PIDs agree with all "expected" PIDs.

As stated above, in most instances the amount of time required to perform a path testing or monitoring function should be kept to a minimum. Unfortunately, in complex telecommunication systems having many nodes, a substantial amount of time may be required for a system controller to transmit "expected" PIDs to all the nodes, and for each of the nodes to acknowledge the receipt of an "expected" PID. During this period, the transmitter 108 is prohibited from transmitting a PID, since a clearance message has not been received from the system controller.

If an attempt were made to expedite the testing/monitoring function by transmitting the proper PID prior to receipt of the clearance message, a "received" PID could arrive at a node prior to the arrival of the "expected" PID sent by the system controller. This would result in a system anomaly. Since the proper "expected" PID has not arrived at the node to be loaded into the "expected" memory location within the node, it will erroneously appear that an improper PID has been received by that node (the "received" and "expected" PIDs stored in the node memory do not match). Actually, no such thing has occurred; the only real problem is a delay in signalling between the system controller and the node. Nonetheless, if this erroneous anomaly persists for more than one second, a system alarm will result (assuming the transmission system conforms to CCITT recommendation G.783). The alarm will require at least another second to be cleared, and cause the total testing/monitoring time to exceed two seconds. Such a long testing/monitoring time would be undesirable within most modern telecommunication systems.

SUMMARY OF THE INVENTION

In accordance with the principles of the invention, a multiple node telecommunication system path identification technique is provided which enables expedited path testing and/or monitoring, and provides rapid confirmation upon completion of a successful testing and/or monitoring function. The technique eliminates erroneous system alarms arising from a properly transmitted PID arriving at a given node prior to the receipt at that node of the correct PID from a system controller. This is accomplished by employing a memory at each system node capable of storing the most recent PID sent to the node by the system controller, the previous PID sent to the node by the system controller, and the PID received from another system node, or from a transmitter linked to a system transmission path. Each of the nodes within the telecommunication system facilitating the technique is further adapted to accept a PID received via a transmission path without triggering an alarm, if that received PID matches either the most recent or previous PIDs received from the system controller. The nodes are also configured to tolerate a mismatch between a PID received via a transmission path and the stored PIDs received from the system controller for a specified period of time before initiating an alarm, so that if the mismatch may be reconciled if it is merely an erroneous condition brought about by a delay in communication between the node and the system controller.

DETAILED DESCRIPTION OF THE INVENTION

Figure 1:
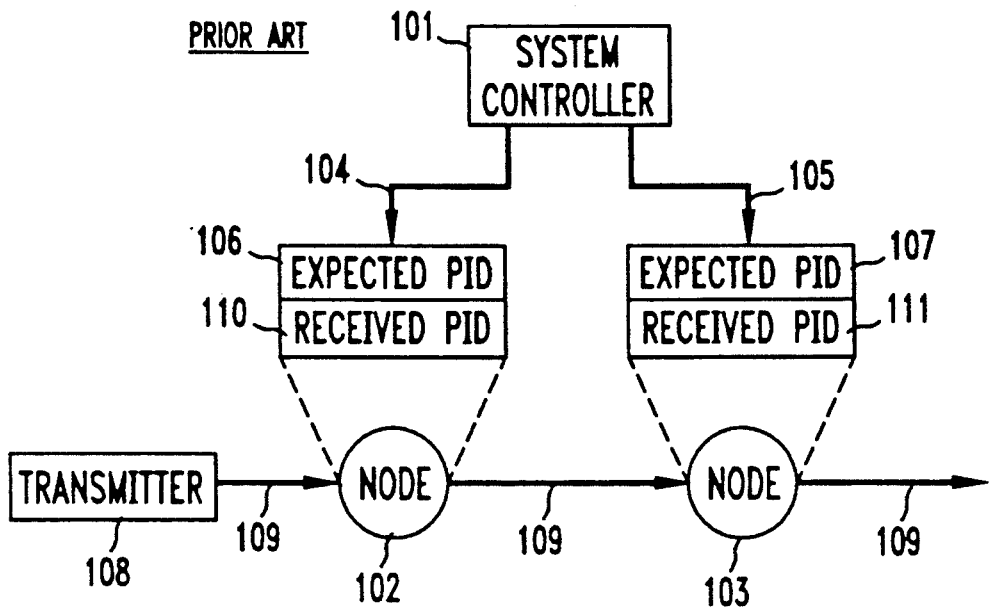
FIG. 1 shows, in simplified block diagram form, a two-node portion of a prior art telecommunication system, in which each node has the capability of storing two PID values.
Figure 2:
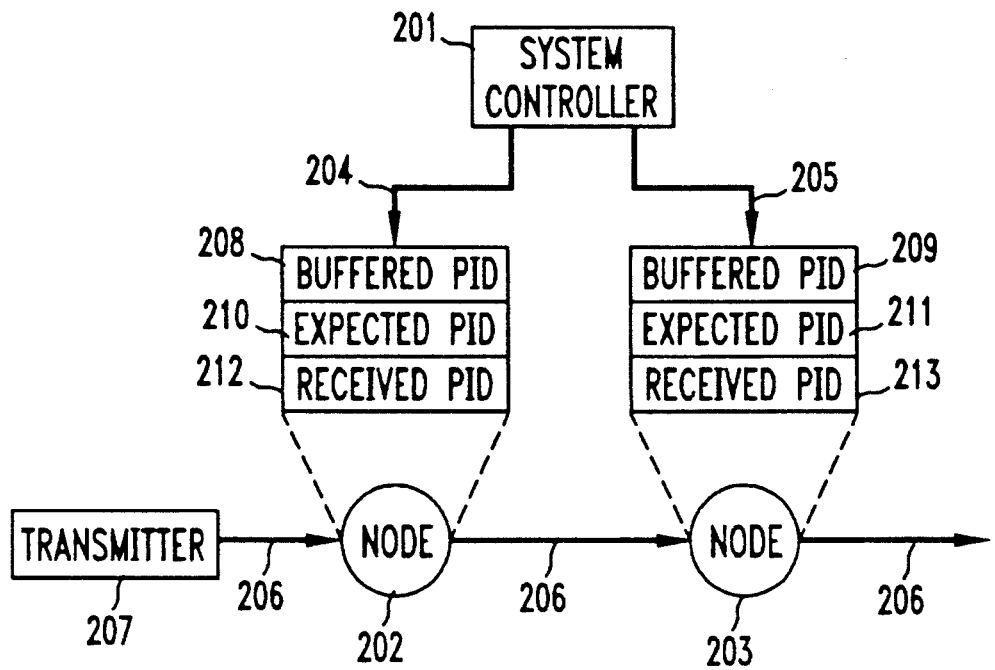
FIG. 2 shows, in simplified block diagram form, a two-node portion of a telecommunication system incorporating a particular embodiment of the invention.

FIG. 2 shows, in simplified form, a two-node portion of a multiple-node telecommunication system incorporating a particular embodiment of the invention. Specifically shown is system controller 201, nodes 202 and 203, control lines 204 and 205, transmission path 206, and transmitter 207. Within each of the nodes, memory locations are provided for the storage of a "buffered" PID (208, 209), an "expected" PID (210, 211), and a "received" PID (212, 213).

In performing a testing or monitoring function within the telecommunication system of FIG. 2, the proper PID for the function is transmitted by system controller 201 to each of nodes 202 and 203 (via control lines 204 and 205, respectively). The PID received from system controller 201 is stored in the memory location within each node designated "buffered" PID memory (memory location 208 for node 202, and memory location 209 for node 203). When a node receives a PID from system controller 201, any previously received PID occupying the "buffered" memory location of the node is overwritten by the new PID.

The proper PID for the function is also transmitted by transmitter 207 to nodes 202 and 203 via transmission line 206. This transmission could be initiated concurrently with the transmission of the proper PID by system controller 201 over control lines 204 and 205. The PID received at each node via transmission line 206 is stored in a memory location within each node reserved for "received" PIDs (location 212 for node 202, and location 213 for node 203). At this point, the response of each node within the system of FIG. 2 to the receipt of a PID via transmission line 206 differs, depending upon whether or not the node has acknowledged the receipt of a new PID from the system controller by transmitting a confirmation signal to the system controller. These differing responses will be addressed separately below, and depicted in the flow diagram shown in FIG. 3.

Figure 3:
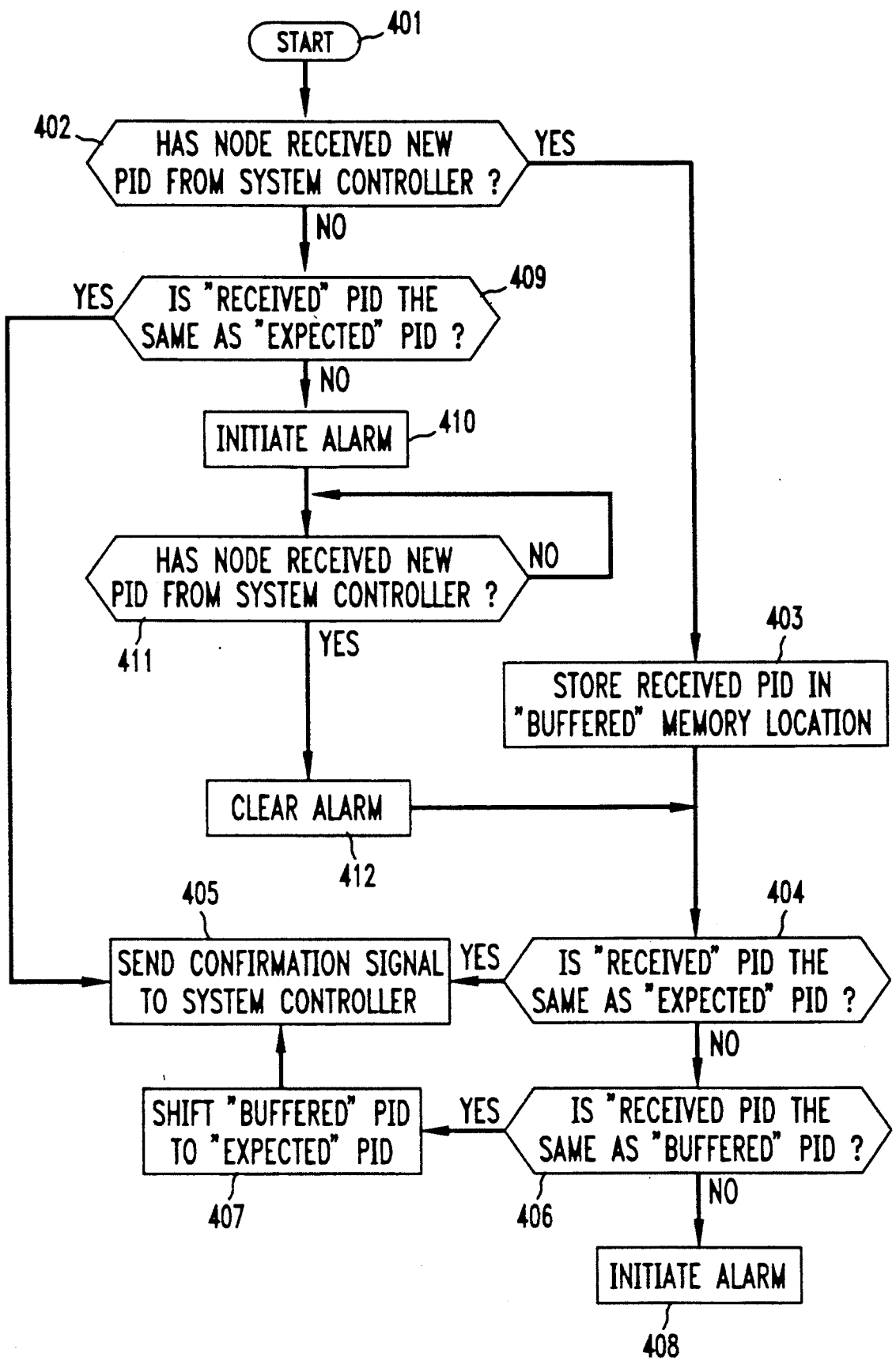
FIG. 3 is a flow diagram of the operations effected within the telecommunication system of FIG. 2 in practicing a particular method of the invention.

The operations illustrated in FIG. 3 are entered into via step 301. If the node had previously acknowledged receipt of a new PID from the system controller by transmitting a confirmation signal to the system controller, conditional block 402 branches to operational block 403, and the PID stored in the "received" memory location is compared with the PID stored in the "buffered" and "expected" memory locations of the node. One of three possible sequences of operation will then be carried out within the system of FIG. 2, in accordance with the following:

1) If the "received" PID matches the contents of the "expected" PID memory, the "received" PID is assumed to be that of an earlier testing/monitoring function still in the process of being performed upon the system. No alarm or action need be initiated by the node, and conditional block 404 branches to operational block 405. In operational block 405 a signal is sent to the system controller verifying a match between the "received" PID and the "expected" PID. This signal confirms that the earlier testing/monitoring function has been successfully implemented up to that node. If the "received" PID does not match the "expected" PID, conditional block 404 branches to conditional block 406.

2) If the "received" PID matches the "buffered" PID conditional block 406 branches to operational block 407, and, the contents of the "buffered" memory location are shifted to the "expected" memory location within that node. Any previously stored PID in the "expected" memory location is overwritten. The node then sends a signal to the system controller verifying a match between the "received" PID and the new "expected" PID (see operational block 405). This confirms that the testing/monitoring function has been successfully implemented up to that node. If the "received" PID does not match the "buffered" PID, conditional block 406 branches to operational block 407.

3) If the "received" PID does not match either the "buffered" or the "expected" PID, a true mismatch has occurred. The node will initiate an alarm in a manner similar to outlined in CCITT recommendation G.783 (see operational block 408).

Contrastingly, if the node had not previously acknowledged the receipt of a new PID from the system controller by transmitting a confirmation signal to the system controller, conditional block 402 branches to conditional block 409, and the PID stored in the "received" memory location is compared with the PID stored in the "expected" memory location. Either of two possible sequences of operation will then be carried out within the system of FIG. 2, in accordance with the following:

1) If the "received" PID matches the contents of the "expected" PID memory, conditional block 409 branches to operational block 405. In operational block 405 a signal is sent to the system controller verifying a match between the "received" PID and the "expected" PID. This signal confirms that the earlier testing/monitoring function has been successfully implemented up to that node. No alarm or additional action need be initiated by the node.

2) If the "received" PID does not match the "expected" PID, a mismatch may have occurred and conditional block 409 branches to operational block 410. In response to this condition, the node will initiate an alarm in a manner similar to outlined in CCITT recommendation G.783 (see operational block 410). However, the mismatch causing this alarm might not be a true mismatch. The node might have already received a new PID front the system controller and stored it in the "buffered" memory location, but the confirmation signal acknowledging such might not have yet reached the system controller. In this situation, the newly received "buffered" PID may match the PID stored in the "received" memory location. To accommodate such an occurrence, the system is adapted to clear any mismatch alarms associated with a particular node upon receipt of a confirmation signal at the system controller front that node. Conditional block 411 tests for the receipt of a new PID from the system controller, and upon detecting such branches to operational block 412 which clears the alarm. The PID stored in the "received" memory location would then be compared with the PID stored in the "expected" and "buffered" memory locations of the node (conditional blocks 404 and 406, respectively), and one of the three possible sequences of operation specified for situations where the node had previously acknowledged the receipt of a new PID is carried out.

Within the sequences described above, the comparison of the contents of a "received" PID memory location to the contents of a "buffered" or "expected" PID memory location may be repeated one or more times over some specified interval. This repetitive comparison would be performed prior to a node initiating an alarm or sending confirmation of a successful testing or monitoring function. This redundant comparison would serve as an additional means of ensuring the suppression of erroneous alarms within the system—A node would only initiate an alarm after two or more comparisons revealed a PID mismatch.

The above described invention provides for a practical and cost effective technique of testing and/or monitoring transmission paths within a multiple node telecommunication system. It will be understood that the particular techniques described are only illustrative of the principles of the present invention, and that various modifications could be made by those skilled in the art without departing from the scope and spirit of the present invention, which is limited only by the claims that follow. One such modification might include having each of the nodes within the system default to an alarm suppression state. In this state, the node suppresses all alarms, regardless of the detection of a PID mismatch, until commanded to do otherwise by the system controller. Another modification would include having each node transmit a "far-end" alarm when a PID mismatch occurs. This far-end alarm would be sent to the transmitter which initiated the testing/monitoring function (similar far-end alarms are specified in CCITT recommendation G.783). The invention may also be implemented and practiced within telecommunication systems which employ signal labels (as opposed to PIDs) as a means of signal compatibility verification. In such systems, the memory locations at each node would be adapted to store signal label values, analogous to the PID values stored in the above described system.

We claim:

1. In a telecommunication system including:
a system controller;
a transmitter;
a plurality of system nodes, each linked to said system controller and said transmitter;
a first memory location contained within each of said nodes;
a second memory location contained within each of said nodes; and
a third memory location contained within each of said nodes;
a method of effecting path trace within said telecommunication system, comprising the steps of:
transmitting a path trace signal from said system controller to a first memory location within a first system node;
transmitting a path trace signal from said transmitter to said second memory location within said first system node;
comparing the contents of said first memory location of said first system node to the contents of said second memory location of said first system node;
transferring the contents of said first memory location within said first system node to said third memory location within said first system node if the contents of said first memory location of said first system node matches the contents of said second memory location of said first system node.

2. In a telecommunication system including:
a system controller;
a transmitter;
a plurality of system nodes, each linked to said system controller and said transmitter;
a first memory location contained within each of said nodes;
a second memory location contained within each of said nodes; and
a third memory location contained within each of said nodes;
a method of effecting path trace within said telecommunication system, comprising the steps of:
storing a current path trace signal sent from said system controller in said first memory location within a first system node;
storing a path trace signal sent from said transmitter in said second memory location within a first system node;
storing a previous path trace signal sent from said system controller in said third memory location within said first system node;
comparing the contents of said second memory location of said first system node to the contents of said first and said third memory locations of said first system node;
initiating an alarm if the contents of said first memory location of said first system node, and the contents of said third memory location of said first system node, do not match the contents of said second memory location of said first system node.

* * * * *